Jan. 13, 1959 L. J. GRESHEL 2,868,887

DIAL GOVERNOR MOUNTING ARRANGEMENT

Filed Oct. 11, 1954

INVENTOR.
Leonard J. Greshel,
BY Brown, Jackson,
Boettcher & Dienner
Attys.

United States Patent Office 2,868,887

Patented Jan. 13, 1959

2,868,887

DIAL GOVERNOR MOUNTING ARRANGEMENT

Leonard J. Greshel, Galion, Ohio, assignor to North Electric Company, a corporation of Ohio Application October 11, 1954, Serial No. 461,309

3 Claims. (Cl. 179—90)

The present application relates to a telephone dial mechanism for use in automatic telephone systems and more particularly to a novel dial governor mounting arrangement.

A conventional telephone instrument, utilizing a dial mechanism, employs a governor assembly for accurately controlling the speed of the dial and the uniformity of the duration of the impulses corresponding to the digits dialed. During the dialling operation, after the calling subscriber has operated the finger wheel in a clockwise direction to bring the finger hole corresponding to the desired digit to the finger stop, the subscriber releases the spring-biased finger wheel which thereupon rotates in a counterclockwise direction, looking at the front of the dial. A suitable gear train is coupled to the finger wheel to operate a set of impulsing spring contacts which transmit an electrical signal corresponding to the dialled digit to the central office to actuate equipment for furthering the extension of the call to the desired subscriber. For proper functioning of the central office equipment, it is imperative that impulses of a constant duration from the impulsing springs reach the central office in order that the automatic equipment may respond in the desired manner.

To insure the accuracy and constancy of the pulse duration as well as to control the dial speed, a governor assembly is utilized as a part of dial telephone mechanism. In several of the more conventional dial arrangements the governor mechanism comprises at least one gear driven by the dial mechanism which rotates a governor shaft. Coupled to the shaft are a plurality of spring biased members at the outer ends of which are disposed small projections or shoes. Surrounding one end of the shaft is a governor drum which encompasses the shoes, and against which the shoes frictionally ride when they are thrown outwardly by the centrifugal force applied to the spring biased members by the rotation of the shaft. The speed of rotation of the governor shaft is determined by this assembly. That is, as the angular velocity of the governor shaft tends to increase, there is a corresponding increase in the friction between the shoes and the inner surface of the governor drum to reduce the velocity of the shaft. If the angular velocity of the governor shaft is insufficient to cause the shoes to rub against the inner surface of the governor drum, the acceleration of the shaft is not inhibited and increases to the point where the centrifugal force produced forces the shoes against the governor drum surface and the above described control action occurs. The resulting constant velocity of the governor shaft is imparted to the remainder of the dial mechanism to insure a constant speed of operation with the resultant accurate timing of the dial impulses.

Conventional dial governor assemblies comprise an excessive number of components which increase the cost of their manufacture. As an example in arrangements of this general structure, there is a separate drum against which the shoes ride during the operation of the dial mechanism and a support assembly for the drum consisting of a perforate bracket which must be in proper alignment with the shaft, the drum and a shaft receiving aperture spaced from the drum to permit the rotation of the shaft. In aligning these components, complex factory techniques are necessitated which require a large number of skilled personnel, a factor which greatly contributes to increased costs in the manufacturing of such units.

An attempt has been made in one prior art structure to simplify the alignment of the governor drum and shaft by deforming the base plate of the dial mechanism to produce a drum receiving chamber at the base of the dial mechanism to receive the separate drum and drum mounting assembly. While this arrangement has to some extent alleviated the alignment problem of the governor assembly, it has introduced other undesirable features. Specifically, the governor mechanism is mounted in an unaccessible position for adjustment or maintenance, and the amount of force required to produce a base plate deformed to the requisite shape is so great as to displace other portions of the base plate so that the alignment problems for the dial mechanism as a whole are magnified rather than decreased.

It is an object of the present invention to provide a new and useful dial governor mounting arrangement which eliminates certain of the shortcomings inherent in prior art structures.

It is another object of the present invention to provide a new and novel dial governor mounting arrangement which has a minimum number of parts and which is simple and economical in assembly.

For a more complete understanding of the nature and scope of the invention, reference may be had to the following detailed description taken in connection with the accompanying drawing in which like numerals indicate like elements and in which.

Figures 1, 1A, 2:
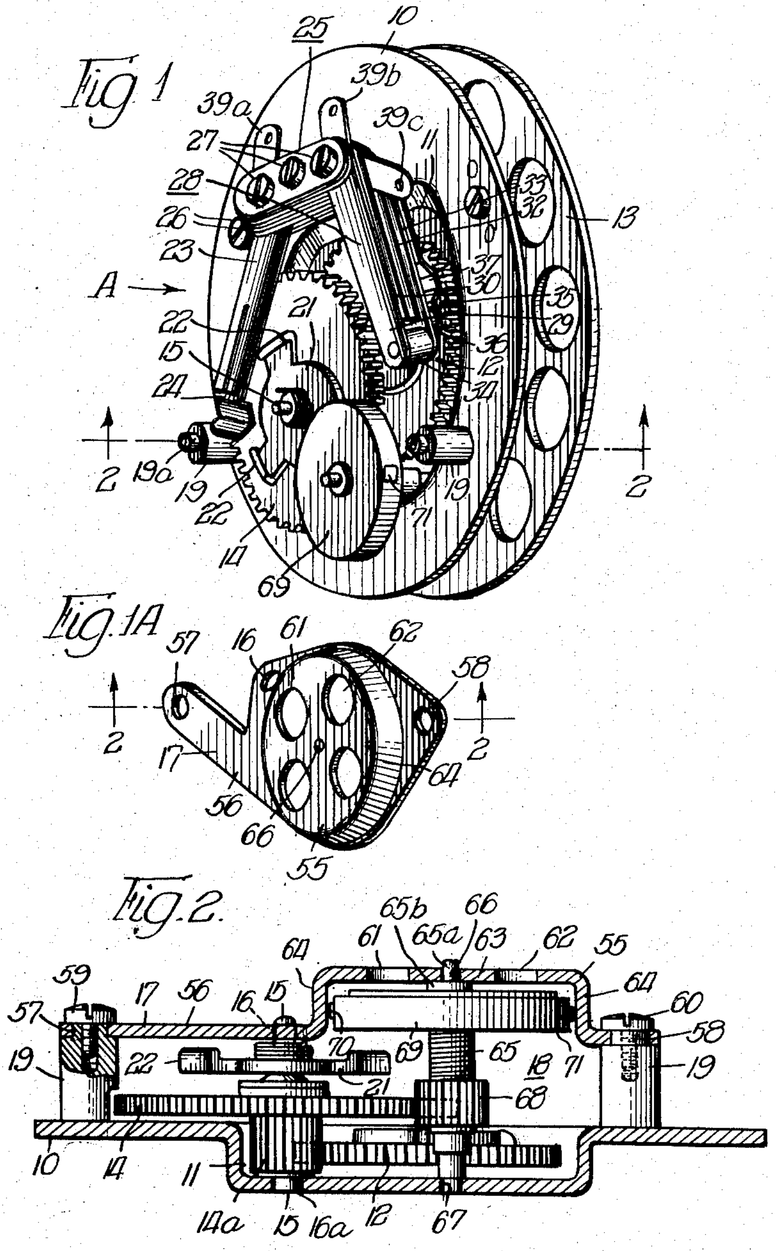
Figure 1 is a perspective view of a telephone dial mechanism incorporating an embodiment of the dial governor mounting arrangement of the present invention.
Figure 1A is a perspective view of the dial governor bracket and housing of the present invention.
Figure 2 is a cut-away side view taken along line 2—2 of Figures 1 and 1A, and illustrates in greater detail the novel mounting arrangement for the dial governor.

The dial governor mounting arrangement basically comprises a base plate and a mounting bracket which has integrally therein a governor housing in spaced parallel relation to the base plate.

Figure 1 illustrates the telephone dialling mechanism and the dial governor shoe assembly. In this figure the base member 10, comprising a thin plate of brass or other suitable material, serves as a mounting base for the remainder of the dial equipment. Base member 10 is shown as being of generally circular shape, although any other suitable shape may be used. A generally circular depression 11 is disposed concentrically at the center of space member 10 and partially encompasses a metallic toothed gear wheel 12. Gear 12 is rotatably connected by a pin (not shown) to a finger wheel 13 disposed at the opposite side of base member 10 and having ten spaced apart openings which are adapted to receive the finger of the user, and which respectively correspond to the digits 1–0 inclusive. A second toothed gear 14 of fiber is coupled to gear 12 by a small pinion gear 14*a* (of Figure 2) situated beneath gear 14 and centrally attached to a shaft 15 which extends through gear 14. One end of pin 15 is rotatably maintained in a small aperture 16 in a bracket 17 which supports a governor assembly shown generally at 18. Governor assembly 18 contains a control mechanism to insure a constant angular velocity of finger wheel 13 and its associated gear train during a portion of their operation. The opposite end of pin 15 is rotatably held by base member 10 in an aperture 16a (shown more clearly in Figure 2) in registration with aperture 16 in bracket 17. Bracket 17 is maintained a predetermined distance above base member 10 by pillars 19 attached at their lower extremities to base member 10 and into which screws are threaded to integrate the completed assembly.

A contact actuating disc 21, centrally mounted for rotation about shaft 15, lies in a plane parallel to and above that of gear 14. Disc 21 has three fingers or projections 22 (only two of which are shown) spaced 120 degrees apart around its periphery. An impulse generating means comprises an upper contact carrying lever or arm 23 extending to a point adjacent the path of movement of projections 22 and which at one extremity has a bifurcated end portion having small projections of gold or other suitable electrical conducting material disposed on its under surface. Disposed immediately below and parallel to contact carrying lever 23 is another contact carrying arm 24 which at one extremity has a V-shaped portion extending downwardly toward fingers 22 of actuating disc 21. The upper surface of arm 24 has a pair of conducting projections corresponding to those at the under surface of the extremity of lever 23 to provide a closed electrical circuit upon contact thereof. The V-shaped extension of arm 24 physically contacts fingers 22 of disc 21 during a portion of their travel and moves up and down as these fingers are rotated below it. The portions of lever 23 and arm 24 opposite the contact carrying ends are bent at an obtuse angle with respect to the contact carrying portions and are maintained fixedly in an assembly 25 comprised of alternative layers of insulating material 26 and the extensions of the contact carrying levers. These alternative layers are maintained in a fixed position by bolts 27 which extend through the assembly and one of which is threaded into base member 10.

An off-normal spring assembly shown generally at 28 comprises an upper pair of contact carrying levers or arms 29 and 30 of electrically conductive material which bear electrical contacts on opposing faces. Contact carrying arm 29 is parallel to and extends beyond the end of contact lever 30. The lower pair of contact carrying levers or arms 32 and 33 are disposed below and in spaced parallel relationship to each other and to the upper contact carrying arms 29 and 30. Each of these upper and lower pairs of contact carrying arms has on opposed faces small deposits of precious metal or highly conductive material (not shown) to insure positive electrical contact upon closure. As in the case of upper contacting lever 29, the lowermost contact carrying lever 33 extends beyond its associated contact carrying arm 32. The extending portions of upper and lower off-normal springs 29 and 33 are separated by a spacing member 34 attached by a rivet to one of these arms and which may be composed of rubber or other suitable insulating material. The contacts of the upper pair 29 and 30 of off-normal springs are maintained in a normally open position while the contacts of the lower pair 32 and 33 of off-normal springs are normally in a closed position. The ends of contact carrying members 32 and 33 opposite the contact carrying ends are maintained in mutually insulated relationship in mounting assembly 25.

A contact actuator assembly arm 35 is disposed below and parallel to the lowermost contact carrying member 33 and at its outermost extremity rests a block of insulating material 36 which is in physical contact with the upper surface of actuator means 35 and the lower surface of contact carrying arm 33. Block 36 is attached to actuator assembly arm 35 by a suitable bolt or rivet. Disposed approximately midway along the length of actuator member 35 is a U-shaped projection 37 which is struck downwardly from the otherwise straight member 35. The under surface of projection 37 is disposed so as to ride upon a small projection (not shown, but disposed below projection 37 in Figure 1) which is affixed to gear 12 near its periphery.

Lugs 39a, 39b, and 39c are electrically connected to appropriate contact carrying levers of each contact assembly and are positioned to receive electrical conducting leads (not shown) which extend to other parts of the telephone instrument.

The operation of the dial mechanism will now be briefly described. In the discussion which follows the direction of rotation of the various gears, etc., is described as viewed from a point "A" situated at the rear of the dial mechanism. Upon the initiation of dialing by the counterclockwise rotation of finger wheel 13, gear 12 which is coupled thereto rotates in the same direction to move the small projection mentioned above away from its position beneath depression 37 of actuator means 35. Upon movement of this projection arm 35 which is biased to move downwardly drops toward the surface of gear 12. This action lowers the position of the upper and lower contact carrying levers 29 and 33 so that the normally open contacts between arms 29 and 30 are now closed, and the normally closed contacts carried by arms 32 and 33 are now opened. The closing of the contacts 29 and 30 shunts the receiver components from the circuit during the dialing operation to prevent dialing pulses from being repeated in the receiver.

When the finger wheel 13 is rotated by an appropriate amount corresponding to a desired digit, it is then released by the user. A spring biasing mechanism, contained in a cup under the finger wheel, causes wheel 13 to be rotated in a clockwise direction until it meets a stop (not shown). Disc 21 is engaged by a pawl and ratchet (not shown) coupled to gear 14 and rotates in a counterclockwise direction as gear 14 revolves in response to the movement of gear 12. Finger extensions 22 of disc 21 are carried in a counterclockwise direction and separately slide under the V-shaped portion of arm 24 to lift it so that the contacts on arms 23 and 24 close when a given finger of disc 21 passes below the V-shaped extension. Arm 24 is raised from its normal rest position by each of fingers 22 and its resilience biases it to return it to that position. As each of these finger extensions 22 rides past the downwardly biased V-shaped extension of arm 24, it returns to its unbiased condition to open the contacts of arms 23 and 24. A predetermined time later a second finger of disc 21 passes below the V-shaped extension to again operate the contacts on arms 23 and 24.

The ratio of the gear train between disc 21 and the finger wheel 13 is so proportioned that for each digit to be registered a series of electrical impulses numerically associated with that digit is generated by the opening and closing of the contacts of arms 23 and 24. This information is transmitted over the appropriate leads extending from the dial mechanism to the equipment in the central office to actuate automatic equipment and complete the dialing in a well known manner. The above sequences of operation are repeated for each digit of the called number.

The dial mechanism housing and the particular relationship between base member 10, governor shoe assembly 18, and bracket 17 (including the integral housing) are more clearly illustrated in Figures 1A and 2. As may be seen in these figures, bracket 17 comprises an upwardly struck governor housing 55 and a flat mounting plate 56 of relatively thin brass stock, having apertures 57 and 58 at either end for the reception of shoulders on pillars 19. Cup-like governor housing 55 comprises a flat upper section 63 of circular form which has a plurality of apertures (only two of which 61 and 62 appear in Figure 2) to provide access for the adjustment of the governor mechanism disposed within housing 55. Connecting the periphery of upper member 63 with flat portion 56 of bracket 17 are depending sides 64 of cylindrical form integrally connected to section 63 and to base portion 56. A small aperture 66 is centrally disposed in upper plate 63 to receive one end of the governor shaft hereinafter described in greater detail. Base 10 is disposed in a plane parallel to and spaced from that of bracket 17 and has an aperture 67 located in registration with aperture 66 of bracket 17.

Pillars 19 are aligned perpendicularly to base 10 and parallel to each other by the controlled flat surfaces of base 10 upon which they are mounted. The lengths of the pillars 19 are carefully determined to insure the parallel and properly spaced relationship between base 10 and bracket 17. Shoulders 19*a* on the upper end of pillars 19 cooperate with registering apertures 57 and 58 in bracket 17 to align upper and lower bearing apertures 66 and 67 for the governor shaft and also apertures 16 and 16*a* for the intermediate shaft 15.

The governor assembly comprises a shaft 65*a* which is maintained in a position perpendicular to the plane of base member 10 by having one end disposed in aperture 66 centrally located on the upper surface 63 of housing 55 and its other end in an aperture 67 located in base member 10 immediately below and in registration with aperture 66. Intermediate the ends of shaft 65*a* is a small pinion gear 68 which has its teeth engaging those of gear 14; the integral hub of pinion gear 68 is freely rotatable on shaft 65*a*. Governor shaft 65*a* has mounted thereon a press fitted governor hub 65*b*, operatively interconnecting the governor hub 65*b* and the hub of pinion gear 68 for driving rotation in one direction is the spring clutch 65 whose inside diameter is slightly less than that of either hub and is wound in the proper direction to drive the governor on dial rundown but not on dial wind-up. At the upper end of shaft 65*a* and within housing 55 is disposed the governor mechanism 69. As in conventional governor mechanisms, a pair of oppositely positioned spring mounted shoes or projections 70 and 71 extend outwardly from the governor mechanism in close proximity to the inner surface of depending sides 64. The specific internal arrangement of governor mechanism 69 forms no part of the present invention and hence a detailed description is not given. However, it is similar in operation to the spring-biased shoe type governor brakes of the prior art.

The operation of the embodiment of Figure 2 can be explained most readily in conjunction with the previous general explanation of the dial mechanism. Specifically upon the release of the finger wheel by the user, gear 14 is rotated. This rotational movement is imparted to pinion gear 68. The rotation of gear 68 causes shaft 65*a*, which is coupled to governor mechanism 69, to rotate by means of the spring clutch arrangement mentioned heretofore. As the speed of rotation of shaft 65*a* and mechanism 69 is increased, the centrifugal force applied to mechanism 69 forces shoes 70 and 71 outwardly to ride the inner surface of depending sides 64 of housing 55. When this occurs the angular velocity of shaft 65*a* and hence the velocity of gear 14 tends to decrease. It is apparent that as the angular velocity of shaft 65*a* further increases the centrifugal force produced increases the amount of friction between shoes 70 and 71 and the inner surface of sides 64 and this increased frictional loss reduces the angular velocity of shaft 65*a*. The speed of rotation of gear 14 and its associated operating gear train is thus controlled within accurate limits. As a result, the making and breaking of the contacts of arms 23 and 24 occurs at accurately spaced intervals so that the impulses sent from the dial mechanism to the central office dial impulse registering equipment properly actuate that equipment.

In fabricating bracket 17 and its associated integral housing 55, it is simply necessary to take a piece of brass stock material of appropriate thickness, and insert it into a blanking and drawing die wherein the housing 55 is depressed from its original position as a part of the flat portion 56 of member 17. The die may have on opposed faces extending fingers and corresponding holes in order to punch out the bolt holes 57 and 58, shaft bearing hole 66 and the four access holes. By a similar stamping operation base member 10 may also be punched out and formed from a piece of brass stock. Since a punch press may be utilized in the fabrication of bracket member 17 and base member 10, the problem of the registration of the bolt holes and the apertures receiving the ends of shaft 65*a* is greatly simplified.

To provide a smoother drum surface for cooperation with the governor shoes, the dimensions of the drawn housing should be so controlled as to allow the drum surface to be reamed or the drum surface could be polished. While this is not a requisite operation, it tends to reduce governor vibrational noise.

The final assembly of the governor is achieved by simply inserting shaft 65*a* of governor shoe assembly 18 in aperture 67, placing bracket member 17 above base member 10 so that apertures 57 and 58 are in registration with shoulders 19*a* of pillars 19 and then coupling both units by means of bolts 57 and 58. In the final assembly, shaft 65*a* is rotatably held in proper alignment by apertures 66 and 67 which are automatically aligned in the assembly of bracket 17 and base 10.

By forming housing 55 integrally with bracket 17, there is a decided material savings over certain prior art structures in which the governor drum is made a separate part. Also in the present invention there is no necessity for a separate mounting arrangement for the governor drum, and the registration problem of mounting the drum so that the shoes ride within and adjacent to its inner surface is obviated.

The present invention therefore provides a dial governor mounting arrangement in which integrally mounted housing encompasses the governor mechanism and results in a structure which is not only economical from a material standpoint, but also extremely economical from an assembly standpoint. Furthermore, the positioning of the governor mechanism inside housing 55 makes it readily available through its access apertures for the adjustment of its components to achieve accurate intervals between dial impulses.

While we have described a preferred embodiment of our invention, it will be apparent that various modifications, changes and re-arrangements may be made without departing from the scope of the present invention, as defined by the appended claims.

I claim:

1. A telephone dial mechanism comprising a base member; a governor shoe assembly; a bracket mounted substantially parallel to said base member and spaced from said base member by said governor shoe assembly; a housing embossed on said bracket adapted to receive said governor shoe assembly; and means associated with said governor assembly supported between said bracket and said base member for supporting said governor shoe assembly within said housing.

2. A telephone dial mechanism comprising a base member, a governor mechanism including a shoe assembly; a bracket mounted in spaced substantially parallel relation with respect to said base member including a housing embossed on said bracket; means in said base plate and said bracket for supporting said governor mechanism; and means for aligning said bracket and said base member with said governor shoe assembly in said housing.

3. A telephone dial mechanism comprising a base member, a rotatable governor shoe assembly having spring-biased members operable in response to centrifugal force, a bracket in spaced parallel relation with respect to said base member including a housing embossed on said bracket to receive said governor shoe assembly and means for positioning said bracket with said housing in operative cooperation with said spring-biased members for controlling the velocity of said governor assembly, thereby to control the velocity of the dial mechanism.

References Cited in the file of this patent

UNITED STATES PATENTS

| | | |
|---|---|---|
| 2,469,974 | McCain | May 10, 1949 |
| 2,503,538 | Arthur | Apr. 11, 1950 |
| 2,563,581 | Clarke et al. | Aug. 7, 1951 |